United States Patent [19]

Hiramatsu et al.

[11] Patent Number: 5,387,029
[45] Date of Patent: Feb. 7, 1995

[54] BUCKLE PRETENSIONER FOR VEHICLE SEAT BELT SYSTEMS

[75] Inventors: Koji Hiramatsu; Muneo Nishizawa, both of Shiga, Japan

[73] Assignee: Takata Corporation, Japan

[21] Appl. No.: 63,524

[22] Filed: May 18, 1993

[30] Foreign Application Priority Data

May 19, 1992 [JP] Japan .................. 4-150143

[51] Int. Cl.⁶ ............................ B60R 22/34
[52] U.S. Cl. ...................... 297/480; 297/468
[58] Field of Search ............ 297/480, 468, 464; 280/806

[56] References Cited

U.S. PATENT DOCUMENTS

| | | | |
|---|---|---|---|
| 3,935,919 | 2/1976 | Kawamura et al. | 297/480 |
| 4,435,000 | 3/1984 | Chiba et al. | 297/480 X |
| 4,678,928 | 7/1987 | Nishimura et al. | 297/468 X |
| 4,700,974 | 10/1987 | Andres et al. | 297/480 X |

*Primary Examiner*—Kenneth J. Dorner
*Assistant Examiner*—Milton Nelson, Jr.
*Attorney, Agent, or Firm*—Brumbaugh, Graves, Donohue & Raymond

[57] ABSTRACT

A buckle pretensioner for a vehicle seat belt system of the type that is mounted on a vehicle seat includes a blocking device for preventing the movement of a movable member of an inertial starting mechanism that controls the operation of the pretensioner from releasing the pretensioner driving device. The blocking device includes a solenoid and an electric power circuit for energizing the solenoid having a seat slide switch that is responsive to movement of the seat release lever for controlling the energy state of the solenoid so that the blocking device prevents movement of the movable member in response to operation of the seat release lever to release the seat for adjustment and a delay circuit for maintaining the energy state of the solenoid established by operation of the seat slide switch for a predetermined period of time after the seat slide switch has been operated. The power circuit may also have a switch that is responsive to insertion of a buckle tongue into the buckle for controlling the energy state of the solenoid such that the blocking device prevents movement of the movable member of the inertial starting mechanism when the buckle tongue is not inserted into the buckle.

3 Claims, 3 Drawing Sheets

BUCKLE PRETENSIONER FOR VEHICLE SEAT BELT SYSTEMS

BACKGROUND OF THE INVENTION

The present invention relates to a pretensioner for vehicle seat belt systems and, in particular, to a buckle pretensioner of the type having an inertia starting mechanism incorporated into it that has a device for preventing the starting mechanism from operating erroneously.

In some seat belt systems used in vehicles such as automobiles, a pretensioner is provided for preventing movement of the body of an occupant by tightening of the belt when excessive acceleration acts on the vehicle and thereby providing greater restraint of the occupant. Although pretensioners can be provided at various locations in a seat belt system, an advantageous location is at the transition point between the lap and shoulder portions of a belt in a three point belt system. Applying tension to the belt at the transition point tightens both the lap and shoulder belt portions and provides better restraint of the occupant. In most three point systems, there is a buckle tongue at the transition point that is connected to a buckle. It is well known to provide a pretensioner that pulls down on the buckle that receives the buckle tongue at the transition point between the lap and shoulder portions of a seat belt.

One manufacturer of a buckle pretensioner, AUTO-LIV Company, has produced commercially a buckle pretensioner having a built-in mechanical inertial starting device. Ordinarily, the AUTO-LIV buckle pretensioner is installed on the side of the vehicle seat, and it may operate erroneously by an abrupt movement of the seat when its position is changed. Accordingly, a linkage has been established by a wire connected from the seat release lever to the inertia starting mechanism of the pretensioner such that when the seat release lever is moved to a position allowing the seat to move, the inertia starting mechanism is prevented from operating to trigger the operation of the pretensioner.

The linkage between the seat release lever and the pretensioner does not always prevent erroneous operation of the pretensioner. It sometimes happens that after the seat position is changed and the release lever moves back to its normal position, the seat is between latched positions and is not latched against subsequent movement, which can occur without moving the release lever, such as upon abrupt acceleration or sharp braking of the vehicle. Such movements of the vehicle can cause the seat to move suddenly and then be stopped abruptly by engaging a stop of the seat slide latch. The abrupt stopping the seat can result in operation of the inertial starting mechanism such as to actuate the pretensioner.

SUMMARY OF THE INVENTION

To solve the above problems, it is one object of the present invention to provide a buckle pretensioner of the type that is mounted on a seat and has an inertial starting mechanism that is also mounted on the seat, such as a starting mechanism integrated with the pretensioner, that reliably prevents operation of the pretensioner resulting from abrupt movements of the seat after its position has been changed but the seat has not become latched to a stop of the seat slide.

Another object of the invention is to prevent the pretensioner from operating whenever a buckle tongue is not inserted into the buckle and it is, therefore, not necessary for the pretensioner to operate.

The foregoing objects are attained, according to the present invention, by a buckle pretensioner for a vehicle seat belt system of the type that is mounted on a vehicle seat and has a driving device for applying a force to a buckle to which a seat belt is attached to move the buckle and apply pretension to a seat belt, an inertial starting mechanism including a movable member arranged to normally prevent the driving device from moving the buckle and movable in response to an inertial force to permit the driving device to move the buckle, and a blocking device for preventing the movable member of the inertial starting mechanism from moving when a seat release lever is moved to a position that enables the vehicle seat to be moved to adjust its position. The invention is characterized in that the blocking device includes a solenoid and an electric power circuit for energizing the solenoid and in that the power circuit includes a seat slide switch responsive to movement of the seat release lever for controlling the energy state of the solenoid so that the blocking device prevents movement of the movable member in response to operation of the seat release lever to release the seat for adjustment and a time delay circuit for maintaining the energy state of the solenoid established by operation of the seat slide switch for a predetermined period of time after the seat slide switch has been operated.

When the seat release lever is moved to release the seat for adjustment of its position, the movable member of the inertial starting mechanism is prevented from moving by engagement by the blocking device, which is operated by the solenoid under the control of the seat slide switch. Accordingly, the pretensioner cannot operate as long as the seat release lever is in a position that allows the seat to be moved for adjustment of its position. After the seat release lever has been returned to its normal position, the delay circuit maintains for a predetermined period of time the energy state of the solenoid that was established when the seat slide switch was operated. If the occupant releases the seat release lever before the seat reaches a stop position, and the seat is immediately moved to stop position, the delay circuit will prevent the pretensioner from operating if the seat is stopped abruptly. If the seat is not moved to a stop position but is between stop positions, the vehicle will in most cases be started into motion soon after the seat is adjusted, and movement of the vehicle will cause the seat to slide to a stop position of the seat locking mechanism. The time delay before the pretensioner can operate ensures in most cases that erroneous operation of the pretensioner will not occur.

According to another aspect of the invention, a buckle pretensioner of the type that is mounted on a vehicle seat and has a driving device for applying a force to a buckle to which a seat belt is attached to move the buckle and apply pretension to a seat belt, an inertial starting mechanism including a movable member arranged to normally prevent the driving device from moving the buckle and movable in response to an inertial force to permit the driving device to move the buckle, and a blocking device for preventing the movable member of the inertial starting mechanism from moving is characterized in that the blocking device includes a solenoid and an electric power circuit for energizing the solenoid and in that the power circuit includes a switch responsive to insertion of a buckle tongue into the buckle for controlling the energy state of the solenoid such that the blocking device prevents movement of the movable member when the buckle tongue is not inserted into the buckle.

The provision of a switch in the buckle for disabling the pretensioner when the buckle tongue is not inserted ensures that the pretensioner will not operate unnecessarily. The buckle switch can be used in combination with the switch associated with the seat release lever or separately. In either case, the buckle switch is especially useful in a buckle pretensioner for the front passenger seat, which is frequently not occupied when the vehicle is being driven.

For a better understanding of the invention, reference may be made to the following description of an exemplary embodiment, taken in conjunction with the accompanying drawings.

DESCRIPTION OF THE EMBODIMENTS

Figure 1:
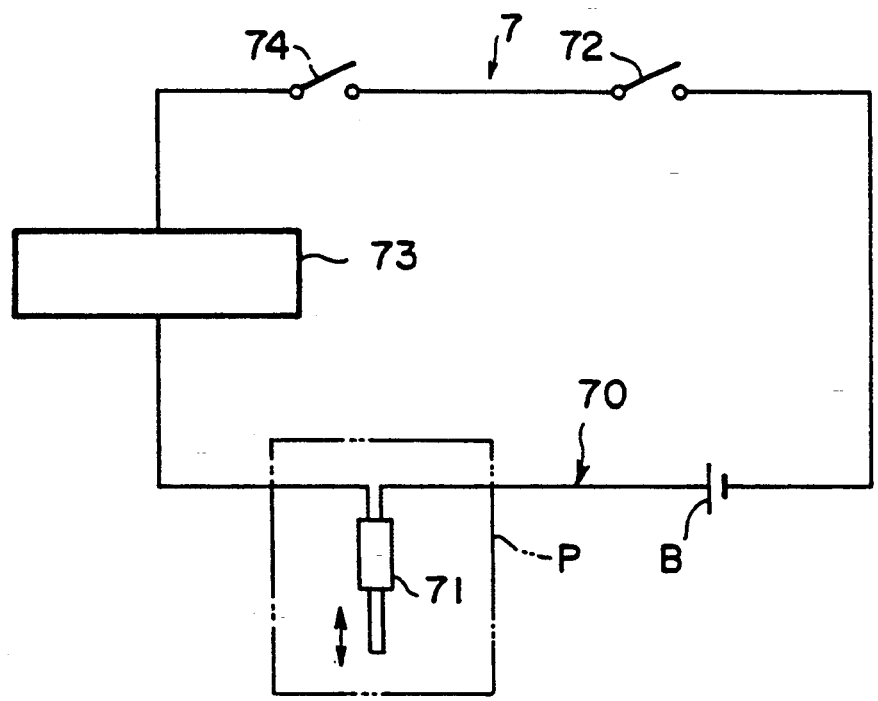
FIG. 1 is a diagram of an electric circuit for a buckle pretensioner according to the present invention.
Figure 2:
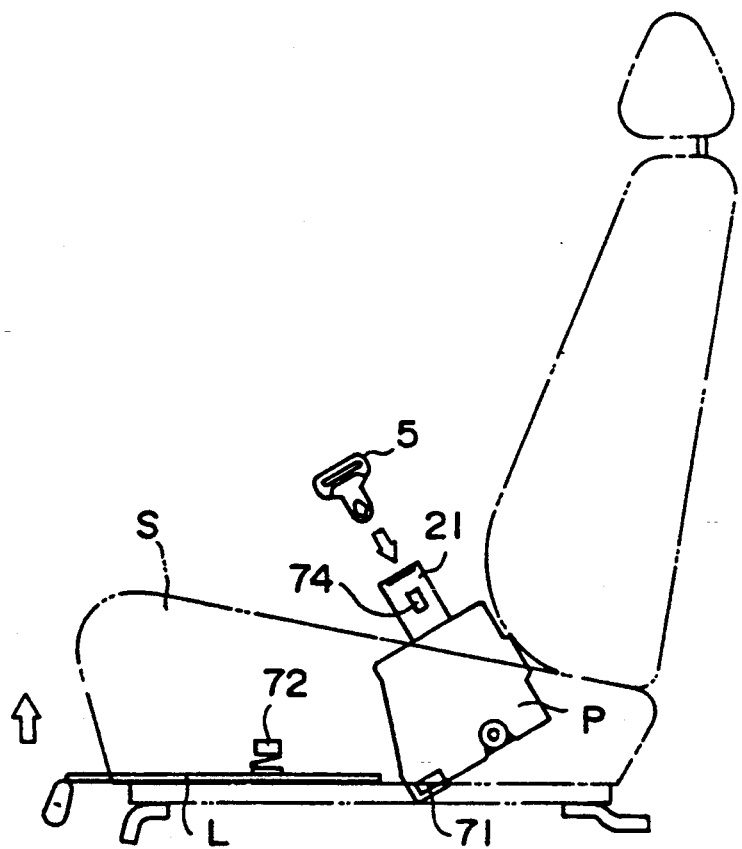
FIG. 2 is a side elevational view of a vehicle seat on which an embodiment of the invention, which is shown schematically, is installed.

The embodiment of the buckle pretensioner shown in the drawings comprises, referring first to FIGS. 1 and 2, a blocking device 7 for preventing erroneous operation of a buckle pretensioner P that is mounted on the side of a seat S. The blocking device 7 includes a solenoid 71, which operates to enable and disable an inertial sensor that is built into the pretensioner, as described below, and an electric power circuit 70 for energizing and deenergizing the solenoid. The power circuit includes a power supply B, a seat slide switch 72 that is opened and closed in response to movements of a seat release lever L mounted on the seat for controlling the energy state of the solenoid 70 so that the blocking device 7 prevents the inertial starting mechanism from causing the pretensioner to operate whenever the seat release lever is moved to release the seat for adjustment and a delay circuit 73 for maintaining the energy state of the solenoid established by operation of the seat slide switch for a predetermined period of time after the seat slide switch 72 returns to its initial state. The circuit also has a buckle switch 74 that is cycled upon insertion of a buckle tongue 5 into the buckle 21 for controlling the energy state of the solenoid such that the blocking device 7 prevents operation of the inertial starting mechanism the buckle tongue is not inserted into the buckle.

The circuit elements may be located in various places. In the embodiment, the solenoid is incorporated into the pretensioner P, the seat slide switch 74 is mounted on the lever L under the seat, and the buckle switch 74 is incorporated into the buckle. The power supply B is the vehicle battery. The delay circuit 73 is incorporated into a suitably located electronic control unit, which may include various other electronic components.

Figure 3:
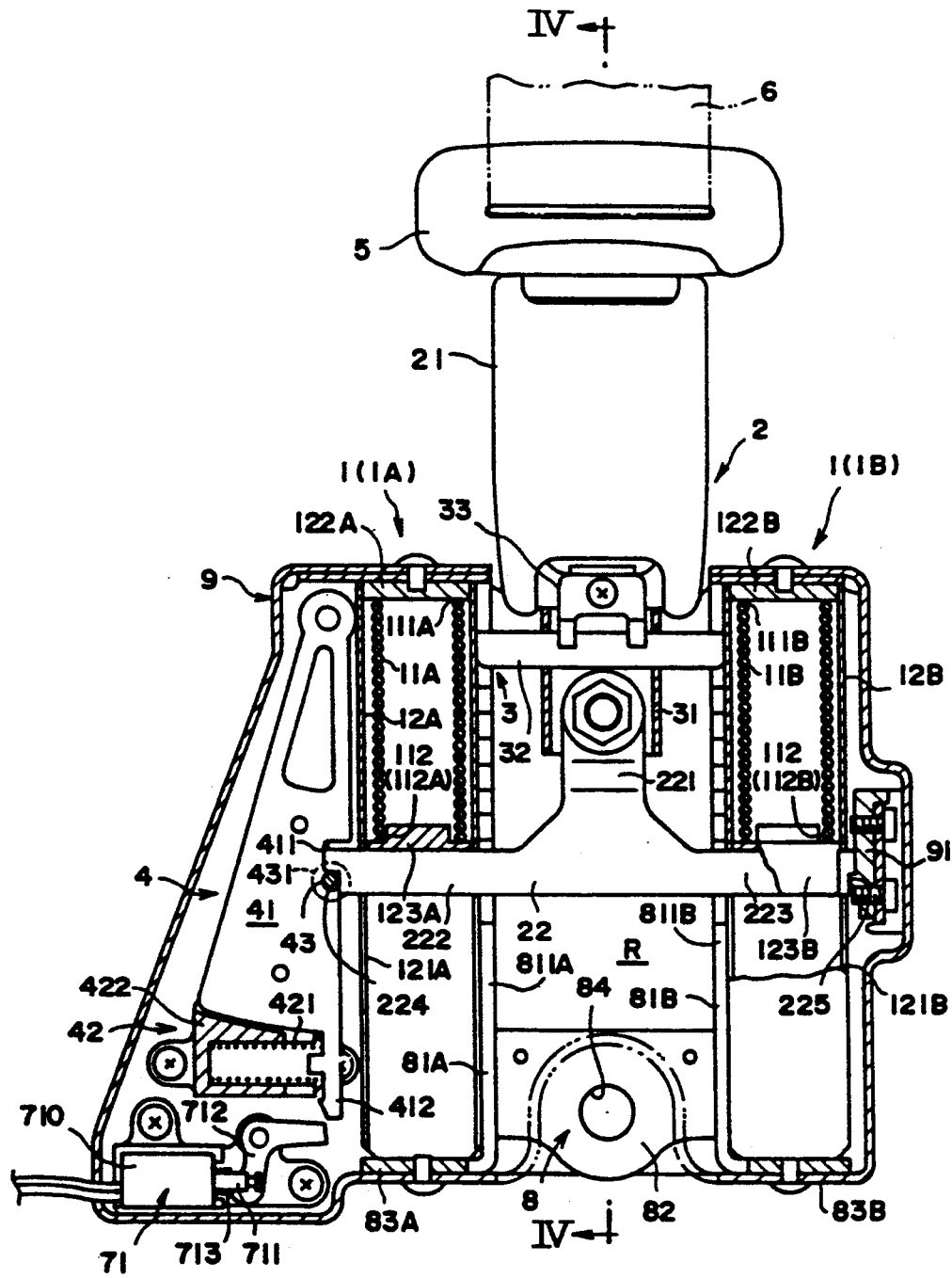
FIG. 3 is a side cross-sectional view of the embodiment.

Referring next to FIG. 3, the pretensioner P includes an axially-acting driving device 1, a belt-pulling device 2, a return-prevention mechanism 3, an inertial starting mechanism 4, and the blocking device 7. Those components are installed on a bracket 8 that is secured to the side of the seat S and are enclosed by a cover 9. The pretensioner pretensions a belt 6 connected by the tongue 5 to the buckle 21 when the buckle is driven downwardly by the driving device 1. The driving device 1 comprises a pair of axially-acting driving assemblies 1A and 1B arranged in tandem with each other with a space between them. The buckle 6 moves into the space between the driving devices 1A and 1B when the pretensioner is operated.

The pretensioner is mounted on the buckle bracket 8, which is provided with a pair of front and rear elongated walls 81A and 81B facing each other with a space R between them, a cross piece 82 for connecting the walls 81A and 81B in its lower portion, and bottom arms 83A and 83B extending outwardly forward and backward from the lower ends of the walls 81A and 81B, respectively. On the two walls 81A and 81B, slits 811A and 811B are formed, respectively, almost over their entire lengths. A bolt hole 84 for affixing the bracket to the seat is provided on the side wall 82.

The axially-acting driving assemblies 1A and 1B comprise, in the embodiment, compression coil springs 11A and 11B, and cylindrical spring guide tubes 12A and 12B for accommodating the springs and having a pair of axial slits 121A and 121B at their lower portions. The upper ends 111A and 111B of the springs 11A and 11B engage and are supported by spring seats 122A and 122B at the upper ends of the spring guide tubes 12A and 12B. The lower operating ends 112A and 112B engage and are supported by a spring stopper 22, which constitutes a part of the belt-pulling device 2, through spring seats 123A and 123B. The spring guide tube 12A is located in front of the wall 81A of the bracket 8, the spring guide tube 12B is arranged in the rear of the wall 81B, the upper ends of the guide tubes are supported by the upper wall of the cover 9, and their lower ends are supported by the bottom arms 83A and 83B of the buckle bracket 8.

The belt-pulling device 2 includes a buckle 21 in the embodiment. As an auxiliary means for connecting the buckle 21 to the belt 6 and the axially driving means 1A and 1B, a tongue 5 slidably mounted on the belt 6 and a part of return-prevention device 3 as described below are provided in addition to the spring stopper 22. The buckle 21 and the tongue 5 are of a commonly known design, and a detailed description is not required or given here. The buckle has the buckle switch 74 built into it in a suitable way.

The spring stopper 22 comprises an upper connection arm 221 that extends upwardly from its central portion and is rotatably connected to the buckle 21. It is a plate of inverted T-shape, which has a front arm 222 and a rear arm 223 extending horizontally in the forward and backward directions, respectively. The operating ends of the main springs 11A and 11B engage spring seats 123A and 123B on the ends of the arms 222 and 223. On the outer lower ends of the two arms 222 and 223, notches 224 and 225 are formed, respectively. The upper end of the upper connection arm 221 of the spring stopper 22 is rotatably fixed by a bolt on a pawl holder 31 of the return-prevention means 3, and the front arm 222 and the rear arm 223 protrude in the front and the rear of the spring guide tubes 12A and 12B through slits 811A and 811B in the buckle bracket 8 and axial slits 121A and 121B of the spring guide tubes 12A and 12B.

The return-prevention mechanism 3 comprises rows of ratchet teeth 311A and 311B formed on the edges of the slits 811A and 811B of the longitudinal walls 81A and 81B of the buckle bracket 8 inside the spring guide tubes 12A and 12B, an elongated plate-like pawl 32 horizontally positioned and movably supported on a pawl holder 31, and a pawl spring 33 attached to the pawl 32. The pawl holder 31 is in the form of a channel and has a bent upper wall that is engaged with a fitting on the buckle 21 and fastened to it. Fan-shaped pawl-supporting holes 311 are formed on the side walls of the pawl holder 31. The pawl 32, along with the spring 33, is received in the pawl-supporting holes 311 and with its lower edge supported by the lower edges of the holes 311, it is positioned in such a manner that its tip can rock toward and away from the ratchet teeth 311A and 311B. The pawl spring 33 biases the pawl 32 in a direction such that the pawl engages the ratchet teeth 311A and 311B.

The inertial starting mechanism 4 comprises a fan-shaped weight 41, the upper end of which is supported on the cover 9 by a pin so that it can pivot back and forth, and biasing means 42 (e.g., a spring) for holding and pushing the weight to the "set" position. The starting mechanism is arranged in front of the spring guide tube 12A within the cover 9. The weight 41 is provided with a recess 411 formed at the center of its rear edge and with a projection 412 extending downward. A roller 43 is supported by the recess 411, and the end of the spring stopper 22 is squeezed by collars 431 on both sides of the roller 43. The weight 41 and the spring stopper 22 are engaged with each other through the roller 43. The projection 412 is abutted by the operating end of a set spring 421 of the biasing means 42, and the base end of the set spring 421 is inserted into a spring seat block 422 and is supported by it. Facing toward the recess 411 is a sub-pawl 91 that is fastened by screws to the cover 9 to the rear of the spring guide tube 12B. This constitutes a stopper for supporting the end of the spring stopper 22 opposite from the starting mechanism in the set position.

The solenoid mechanism of the blocking device 7 is mounted on the cover 9 below the spring seat block 422 and includes a coil 710, a plunger 711 that is pulled into the coil when the solenoid is energized, and a crank 712 rotatably supported on the cover and having one arm connected to the plunger. The other arm of the crank is located such that when the plunger is pushed out of the coil by a return spring 713, the tip moves into the path of the projection 412 on the weight 41 and stops the weight from pivoting forwardly. When the solenoid is deenergized, the crank is pivoted against the bias of the return spring, and the tip of the crank moves out of the path of the projection 412.

FIG. 3 shows the pretensioner in the set condition. The notch 224 on the stopper is supported by the weight 41 through the roller 43, and the notch 225 is supported by the sub-pawl 91. The springs 11A and 11B are held in the set condition with maximum compression. In this condition, the buckle 21 is at the uppermost position, and the buckle tongue 5 permits the belt 6, which passes through it, to run loosely along the body of the occupant. Normally, the seat slide release lever L is in a position that maintains the seat locked against sliding, and the seat slide switch 72 (FIG. 1) is closed. With the buckle tongue inserted into the buckle, the buckle switch 74 is also closed. Accordingly, the solenoid 71 is energized, and the plunger 711 is pulled into the coil and holds the crank 712 against the bias of the return spring 713 in a position clear of the projection 412 on the weight 41. Thus, the inertia starting mechanism 4 is enabled and the pretensioner can operate.

Figure 4A:
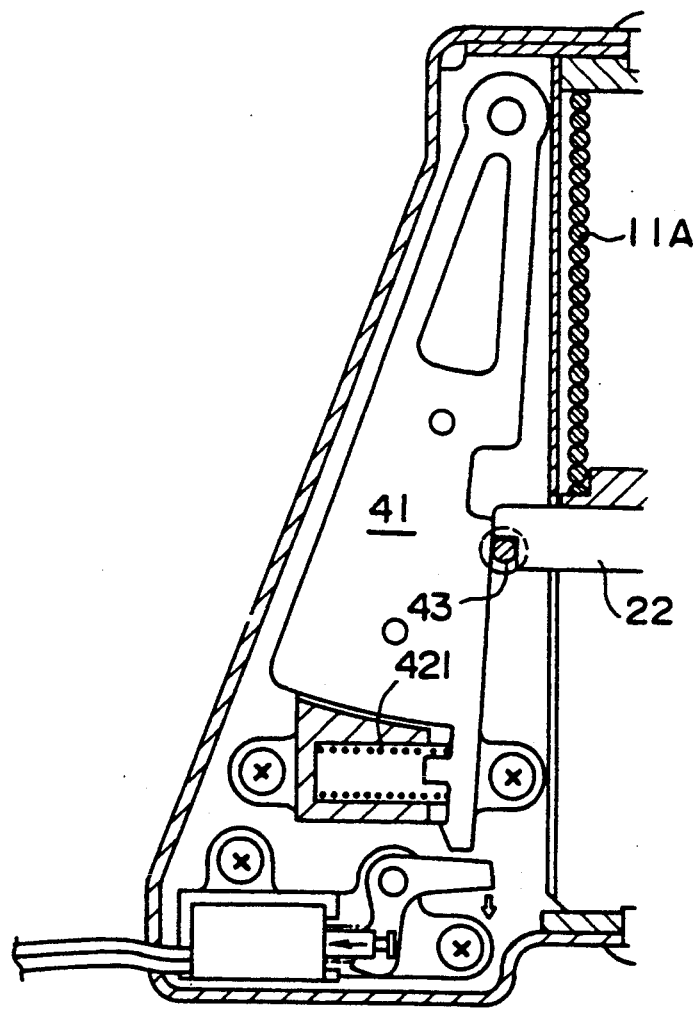
FIGS. 4(A) and 4(B) are partial side cross-sectional views showing how the pretensioner operates.

The operation of the pretensioner is as follows. When an acceleration higher than a predetermined value is applied to the vehicle and is detected by the weight 41, which serves as a sensor, the weight compresses the set spring 421 by inertial force and rotates clockwise, with reference to FIG. 3. By this rotation of the weight 41, the roller 43 starts rolling and is separated from the notch 224 of the spring stopper, as shown in FIG. 4(A). Having lost the support on the side acted on by the main driving spring 11A, the spring stopper 22 is slightly tilted around the supporting point on the sub-pawl 91 by the resilient force of the spring 11A. It is then separated from the supporting point and is pushed quickly downward from the starting position shown in FIG. 4A by the force of the two springs 11A and 11B.

By this operation, the buckle 21 connected to the spring stopper 22 is pulled into the space R within the cover 9 accompanied by the tongue 5 and the pawl holder 31. The pawl 32 ratchets down along the teeth 311A and 311B, which pivot the pawl repeatedly out against the bias of the pawl spring 33. When the buckle reaches the end of its stroke in a direction to pretension the seat belt, the spring stopper 22 hits the bottom feet 83A and 83B of the bracket 8 and stops. After the buckle is no longer subject to a driving force in a direction to apply more tension to the belt, the inertia of the seat occupant applies a force to the belt that begins to move the buckle in a direction releasing the pretension. When this happens, the ends of the pawl 32, under the bias of the pawl spring 33, engage the ratchet teeth 311A and 311B. The engagement of the pawl 32 with the ratchet teeth stops the movement of the buckle in the release direction tending to reduce the pretension. Thus, loosening of the belt 6 after the pulling operation is prevented, and the pretension imparted to the belt is maintained.

Figure 4B:
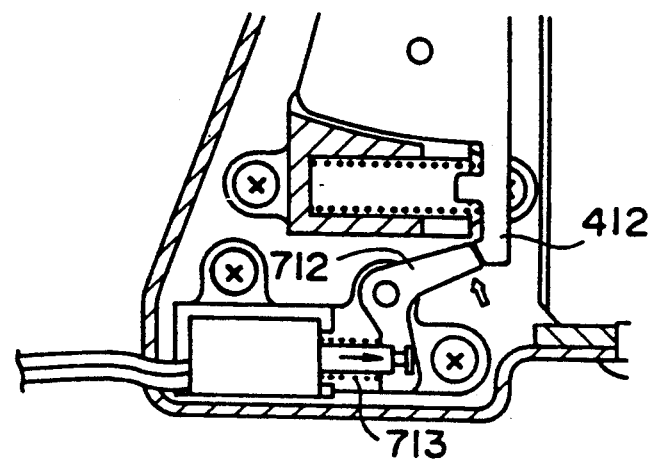

If the seat occupant pulls up the seat slide release lever L to adjust the position of the seat S, the seat side switch 72 is opened. If the seat belt is attached by the buckle tongue so that the buckle switch 74 is closed, the opening of the seat slide switch deenergizes the solenoid 71. Thereupon, the return spring 713 pushes the crank 712 to the position shown in FIG. 4(B), in which the tip of the crank is positioned in front of the projection 412 on the weight 41 and the inertia starting mechanism 4 of the pretensioner P is disabled. Accordingly, if the seat should be stopped abruptly when it is being moved, the pretensioner cannot operate.

When the occupant releases the seat slide release lever L, the switch 72 closes. The solenoid 71 remains deenergized for a predetermined time, however, because the time delay circuit 73 prevents the energization of the solenoid. Accordingly, if the occupant releases the lever L before the seat reaches a stop position or if the seat is stopped between stop positions, the block device 7 keeps the inertial starting mechanism 4 disabled, so that pretensioner cannot operate if the seat should move and then stop abruptly after the lever L has been released and has returned to its normal position. Thus, erroneous operation of the pretensioner is prevented. After the delay time, the solenoid 71 is energized, and the crank 712 is pivoted out of the path of the projection 412 by the solenoid plunger 711.

The blocking device 7 also maintains the pretensioner in a disabled state whenever the buckle tongue 5 is removed from the buckle 21. In this case, the buckle switch 74 is open, and the solenoid 71 is deenergized. The return spring 713, therefore, pivots the crank 712 to the position shown in FIG. 4(B), in which its tip is in the path of the projection 412. The disabling of the pretensioner when the belt is not done up, in the case of the front passenger seat, prevents the pretensioner from operating in an accident when the seat is unoccupied, so it will not have to be reset.

The above-described embodiments is intended to be exemplary. The specific arrangements of the components can, therefore, be modified within the scope of the claim attached hereto. For example, whereas the circuit 70 in the embodiment maintains the operative state of the inertial starting device 4 by energizing the solenoid, the operative state may be maintained by the return spring, and the inoperative or disabled state established by energizing the solenoid. In this case, the direction of pivoting of the crank will be reversed, and parallel circuits for the buckle switch 74, one the one hand, and the seat slide switch and time delay circuit, on the other hand, will be provided.

We claim:

1. A buckle pretensioner for a vehicle seat belt system of the type that is mounted on a vehicle seat and has a driving device for applying a force to a buckle to which a seat belt is attached to move the buckle and apply pretension to the seat belt, an inertial starting mechanism including a movable member that is arranged to normally prevent the driving device from moving the buckle and that is movable in response to an inertial force to permit the driving device to move the buckle, and a blocking member for preventing the movable member from moving when a seat release lever is moved to a position that enables the vehicle seat to be moved to adjust its position, characterized in that the blocking device includes a solenoid and an electric power circuit for energizing the solenoid, and in that the power circuit includes a seat slide switch responsive to movement of the seat release lever for controlling the energy state of the solenoid so that the blocking device prevents movement of the movable member in response to operation of the seat release lever to release the seat for adjustment and a delay circuit for maintaining the energy state of the solenoid established by operation of the seat slide switch for a predetermined period of time after the seat slide switch has been operated.

2. A buckle pretensioner according to claim 1 and further characterized in that the power circuit further includes a switch responsive to insertion of a buckle tongue into the buckle for controlling the energy state of the solenoid such that the blocking device prevents movement of the movable member when the buckle tongue is not inserted into the buckle.

3. A buckle pretensioner for a vehicle seat belt system of the type that is mounted on a vehicle seat and has a driving device for applying a force to a buckle to which a seat belt is attached to move the buckle and apply pretension to the seat belt, an inertial starting mechanism including a movable member that is arranged to normally prevent the driving device from moving the buckle and that is movable in response to an inertial force to permit the driving device to move the buckle, and a blocking member for preventing the movable member from moving, characterized in that the blocking device includes a solenoid and an electric power circuit for energizing the solenoid, and in that the power circuit includes a switch responsive to insertion of a buckle tongue into the buckle for controlling the energy state of the solenoid such that the blocking device prevents movement of the movable member when the buckle tongue is not inserted into the buckle.

* * * * *